United States Patent [19]

Nikaidoh et al.

[11] Patent Number: 4,750,084
[45] Date of Patent: Jun. 7, 1988

[54] CERAMIC LAMINATED CAPACITOR

[75] Inventors: Takashi Nikaidoh; Hisashi Izumida, both of Miyagi, Japan

[73] Assignee: Alps Electric Co., Ltd., Japan

[21] Appl. No.: 18,928

[22] Filed: Feb. 25, 1987

[30] Foreign Application Priority Data

Jul. 3, 1986 [JP] Japan .......................... 61-101413[U]

[51] Int. Cl.⁴ .......................... H01G 4/10; H01G 7/00
[52] U.S. Cl. .................................. 361/321; 29/25.42
[58] Field of Search ............... 361/306, 320, 321, 322, 361/308–310, 323; 29/25.42

[56] References Cited

U.S. PATENT DOCUMENTS

| | | | |
|---|---|---|---|
| 1,824,805 | 9/1931 | Dubilier | 361/308 |
| 2,336,091 | 12/1943 | Gray | 361/310 |
| 4,205,364 | 5/1980 | Pereira | 361/321 X |
| 4,434,452 | 2/1984 | Hamabe et al. | 361/309 X |
| 4,509,103 | 4/1985 | Prymak | 361/321 |

Primary Examiner—Donald A. Griffin
Attorney, Agent, or Firm—Guy W. Shoup

[57] ABSTRACT

A ceramic laminated capacitor having an approximately cylindrical external configuration. Dielectric layers and inner electrode layers are laminated, and the inner electrode layers are connected to outer electrodes to unite them into one body. A pair of insulators having a vertical section of a segment are bonded to the opposing end surfaces of the dielectric layers such that the convex surfaces of the insulators face outward.

3 Claims, 5 Drawing Sheets

CERAMIC LAMINATED CAPACITOR

BACKGROUND OF THE INVENTION

1. Field of the Invention

The present invention relates to a ceramic laminated capacitor and, more particularly, to an approximately cylindrical ceramic laminated capacitor which is suitable for automatic mounting.

2. Description of the Prior Art

Ceramic laminated capacitors were developed in order to obtain small-sized and large-capacity capacitors. Generally, they have an external appearance shown in FIG. 11. Such a ceramic laminated capacitor is externally composed of a ceramic dielectric 1 and outer electrodes 2, to which are connected the end portions of an inner electrode (not shown) which is arranged in the shape of the teeth of a comb in the interior of the ceramic dielectric 1.

A method of manufacturing a ceramic laminated capacitor having the above-described structure will now be explained.

A slurry is first formed by milling ceramic powder, a binder resin of, for example, acryl or polyvinyl, and a solvent such as water or trichloroethane in a predetermined ratio, and a green sheet is formed of the slurry in the step of casting. In the step of casting, the slurry is applied to a continuous base film having a certain degree of heat resistance and release properties such as a polyethylene terephthalate film to a thickness of 20 to 100 μm, and thereafter the solvent in the slurry is dried to form what is called a green sheet, which is then released from the base film.

A predetermined shape was blanked out of the green sheet, and an electrode paste containing palladium and the like is printed on the green sheet in the next step of printing to form a multiplicity of inner electrodes.

A plurality of such green sheets are laminated such that the directions of the inner electrodes on the adjacent green sheets are opposite. In the subsequent step of press bonding, the laminated green sheets are press bonded so that the adjacent green sheets are integrally bonded. Thus a laminate of the green sheets is obtained.

The laminate is cut at each electrode with, for example, a blade in the next step of cutting, whereby a multiplicity of chips are obtained from one laminate. The chip is baked in the next step to remove the binder resin, and is further baked to sinter the ceramic powder in the slurry. In the subsequent step of abrasion, the corner portions including the sections are abraded by barrel finishing.

A metal-glazed conductive paste is bonded to both ends of the chip to form outer electrodes, which are then subjected to nickel-plating or solder-plating, whereby a ceramic laminated capacitor having a configuration of a rectangular parallelepiped such as that shown in FIG. 11 is formed.

Such a laminated ceramic is formed by cutting the laminate of green sheets, as described above, so that the basic external appearance thereof is in the shape of a rectangular parallelepiped, as shown in FIG. 11. Generally, a multiplicity of laminated ceramic capacitors are accommodated in a continuous belt-like body A called a taping reel. When they are actually handled, the belt-like body A is conveyed by a reel machine, and the laminated ceramic capacitors accommodated in the belt-like body A are sucked due by means of vacuum pressure successively so that they are automatically mounted on a printed circuit base board at predetermined positions.

An automatic mounting machine which conveys capacitors at a high speed by utilizing vibration has recently been developed in place of the above-described taping reel system. Such an automatic mounting machine conveys a multiplicity of chips successively by vibrating a synthetic resin tube which accommodates the chips. According to this machine, since chips are conveyed by vibration, it is possible not only to increase the speed at which the chips are conveyed but also to improve the efficiency at which the chips are accommodated in comparison with the taping reel system. Since it is necessary to make the chips being conveyed slide smoothly in the tube, this machine is suitable for chips having a cylindrical external configuration, for example, cylindrical single-layer ceramic capacitors having a smaller capacity than the above-described ceramic laminated capacitor. On the other hand, ceramic laminated capacitors having a rectangular parallelepipedic external configuration are inconveniently caught in the tube, so that it is difficult to convey them smoothly.

To solve this problem, methods of producing an approximately cylindrical ceramic laminated capacitor from a rectangular parallelepipedic chip by chamfering the outer peripheral corners of the rectangular parallelepipedic chip in the step of grinding or cutting before or after the step of baking have recently been proposed (Japanese Patent Laid-Open No. 34622/1984, Japanese Patent Laid-Open No. 82712/1984). However, such chamfering process is very difficult for small-sized chips. Chamfering a chip before the step of baking involves a risk of inducing the displacement of the inner electrode or separation between the green sheet layers, while chamfering a chip after the step of baking takes much time because the chip after being baked is very hard.

SUMMARY OF THE INVENTION

Accordingly, it is an object of the present invention to eliminate the above-described problems in the prior art and to provide a ceramic laminated capacitor having a configuration as close to a cylinder as possible, which configuration enables the capacitor to be conveyed in a tube.

To achieve this aim, the present invention provides a ceramic laminated capacitor fabricated by laminating dielectric layers and inner electrode layers, connecting the inner electrode layers to outer electrodes to unite them into one body, and integrally bonding a pair of insulators having a vertical section of a segment to the opposing end surfaces of the dielectric layers such that the convex surfaces of the insulators face outward.

As described above, since a laminated ceramic capacitor according to the present invention is fabricated by integrally attaching a pair of semicylindrical green sheets to the upper and lower ends of the laminated green sheets with an inner electrode printed thereon when they are press bonded or by bonding a pair of semicylindrical insulating material of ceramic or synthetic resin to at least the opposing end surfaces of a rectangular parallelepipedic chip formed by press bonding green sheets, it is possible to make the external configuration of the chip approximately cylindrical without damaging the inner electrode in the step of press bonding.

The above and other objects, features and advantages of the present invention will become clear from the following description of the preferred embodiments thereof, taken in conjunction with the accompanying drawings.

BRIEF DESCRIPTION OF THE DRAWINGS

FIGS. 1 to 8 show in combination an embodiment of a ceramic laminated capacitor according to the present invention, wherein FIG. 1 is a perspective view of the external appearance of the ceramic laminated capacitor;

FIG. 2 is an explanatory view of the step of casting;

FIG. 3 is a plan view of a blank green sheet having projections;

FIGS. 4 and 5 are sectional views of the step of lamination;

FIG. 6 is a sectional view of the step of press bonding;

FIG. 7 is a perspective view of a laminate after the step of press bonding; and

FIG. 8 is an explanatory view of the external appearance of a chip;

DESCRIPTION OF THE PREFERRED EMBODIMENTS

Embodiments of the present invention will be explained hereinunder with reference to the accompanying drawings.

Figure 1:
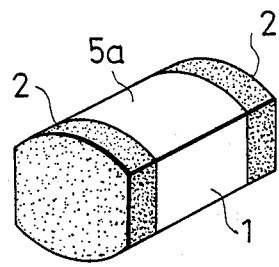

FIG. 1 is a perspective view of an embodiment of a ceramic laminated capacitor according to the present invention. A manufacturing process for the ceramic laminated capacitor will be explained in the following with reference to FIGS. 2 to 8.

Figure 2:
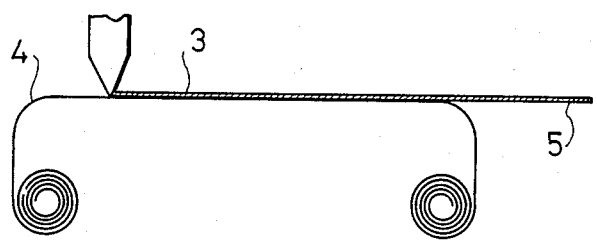

A dielectric of ceramic powder, a binder resin such as an acrylic resin or polyvinyl butyral, and a solvent such as water or trichloroethane are first milled by a ball mill and formed into a slurry 3. The slurry 3 is applied to a belt-like base film 4 of, for example, polyethylene terephthalate to a thickness of 20 to 100 $\mu$m in the next step of casting, as shown in FIG. 2. After the slurry 3 is dried so that a green sheet 5 is formed on the base film 4, the green sheet 5 is released from the base film 4.

A multiplicity of inner electrodes (not shown) are next printed on the green sheet 5. In the step of printing the inner electrodes are printed by ordinary screen printing using an electrode paste which consists of, for example, palladium particles, a binder resin such as ethyl cellulose and a solvent such as mineral spirit.

Figure 3:
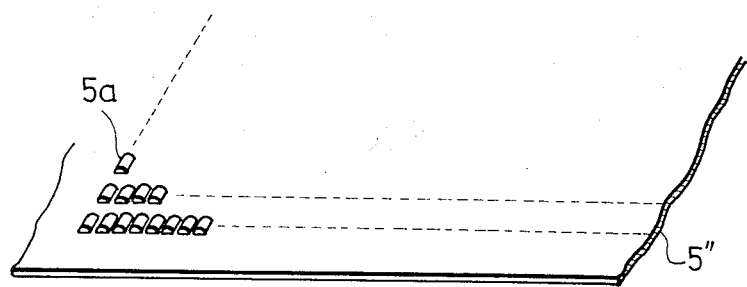

In the step of printing, two kinds of green sheets in which the phases of inner electrodes are different from each other with respect to a predetermined positioning reference (hereinunder these green sheets are referred to as "A-pattern green sheet" and "B-pattern green sheet") are prepared, and another two kinds of green sheets with no inner electrode formed thereon (hereinunder these green sheets are referred to as "blank green sheets" and represented by the reference numerals 5' and 5") are also prepared. One blank green sheet 5' is a plate-like sheet on which no inner electrode is formed and has a thickness of 20 to 100 $\mu$m, while the other green sheet 5" is provided with a multiplicity of semicylindrical projections 5a in correspondence with the inner electrodes by pressing, as shown in FIG. 3. The pressing process is carried out by stamping the green sheet 5" of 100 to 300 $\mu$m thick by a die having a multiplicity of semicylindrical recesses. A plurality of these four kinds of green sheets, 5, 5' and 5" are laminated and bonded by a press in the next step, whereby a laminate of green sheets are formed. The step of lamination and press bonding using the press will now be explained with reference to FIGS. 4 to 6.

Figure 4:
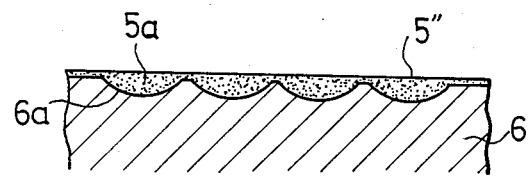
Figure 5:
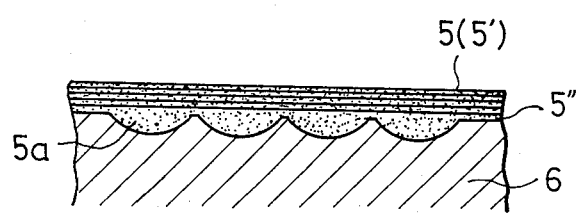

The blank green sheet 5" provided with the projections 5a are first placed on the bottom die 6 which is provided with a multiplicity of semicylindrical recesses 6 and is positioned such that the recesses 6a are fit into the projections 5a, as shown in FIG. 4. Another blank green sheet 5' provided with no protrusion is next placed on the flat side of the blank green sheet 5" which is provided with the projections 5a. In this way, a predetermined number of green sheets 5' without any inner electrode are laminated on the green sheet 5" provided with the projections 5a.

Thereafter, for example, the A-pattern green sheet 5 provided with the inner electrodes is placed and positioned on the laminate consisting of the two kinds of blank green sheets 5' and 5". The B-pattern green sheet 5 is next placed and positioned thereon. In this way, the A-pattern green sheet 5 and the B-pattern green sheet 5 are laminated alternately or, if necessary, with the blank green sheet 5' interposed therebetween, until a predetermined number of green sheets are laminated such that the inner electrodes of the A-pattern green sheets and the B pattern green sheets are opposed in the shape of the teeth of a comb (see FIG. 5).

Further, a plurality of blank green sheets 5' without any inner electrode are laminated in the same way on the thus-formed laminate of the green sheets and, finally, the blank green sheet 5" provided with the projections 5a is placed on the uppermost layer of the blank green sheet 5' such that the peripheral surfaces of the projections 5a face upward.

Figure 6:
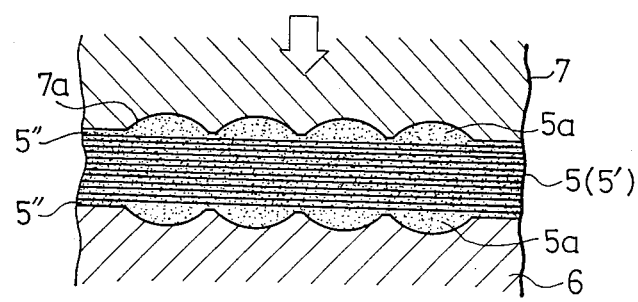
Figure 7:
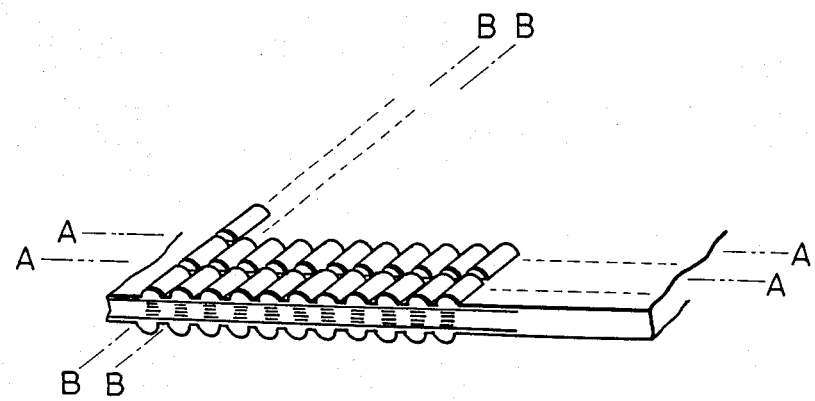

In this way, after the pair of blank green sheets 5" provided with the projections 5a are laminated in the opposite direction to each other with the plurality of green sheets 5 having the inner electrodes and blank green sheets 5' interposed therebetween, the top die 7 of the press is lowered to press bond each of the green sheets 5 and the blank green sheets 5' and 5", as shown in FIG. 6. Further, a pressing force of approximately 0.3 to 3.0 t/cm² is applied to the top die 7 in the direction indicated by the arrow, so that the green sheets 5 and the blank green sheets 5' and 5" are clamped between the bottom die 6 and the top die 7, thereby integrally bonding these layers. At this time, since the clamping surfaces of the bottom die 7 and the top die are provided with the recesses 6a and 7a, respectively, in correspondence with the projections 5a formed on the outermost green sheets 5a", the laminate 8 after bonding has a multiplicity of projections 5a on the upper and lower surfaces through the inner electrodes, as shown in FIG. 7.

Figure 8:
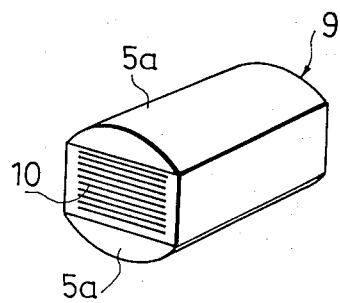

The laminate 8 is cut along the outline of each projection 5a (along the lines A—A and B—B in FIG. 7), namely, at every electrode with, for example, a blade (not shown) in the next step of cutting, so that a multiplicity of chips 9 having an approximately cylindrical configuration are obtained from one sheet of laminate 8 such as that shown in FIG. 8 (in FIG. 8, the reference numeral 10 denotes the inner electrodes).

The chips 9 are then baked while gradually raising the temperature up to about 300° C., and thereafter further heated to about 1,200° to 1,400° C. to be baked.

The end surfaces and the corner portions of the chip 9 after baking are abraded by barrel abrasion. Since the chip 9 has already been formed into an approximately cylindrical configuration, it is possible to greatly shorten the abrasion time in comparison with the prior art. Finally, outer electrodes 2 consisting of, for example, a metal-glazed conductive paste are attached to the chip 9, and after drying and baking, the outer electrodes 2 are subjected to solder plating. Thus, an approximately cylindrical ceramic laminated capacitor with the inner electrode layers opposed through the ceramic dielectric layers is obtained, as shown in FIG. 1.

Figure 9:
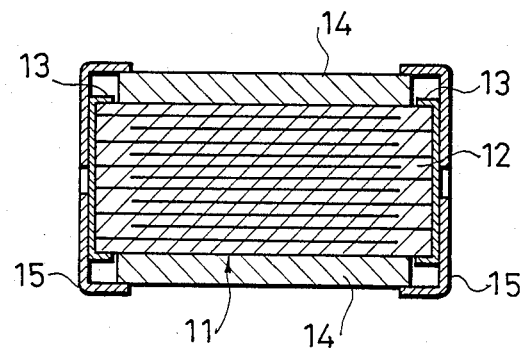
FIG. 9 is a sectional view of another embodiment of a ceramic laminated capacitor according to the present invention.
Figure 10:
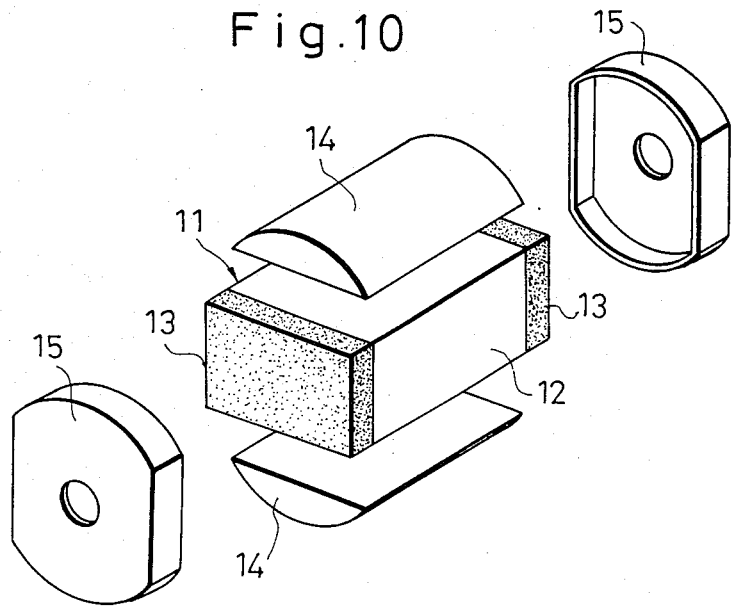
FIG. 10 is an exploded perspective view of the ceramic laminated capacitor shown in FIG. 9.

FIG. 9 is a sectional view of another embodiment of a ceramic laminated capacitor according to the present invention, and FIG. 9 is an exploded perspective view of the ceramic laminated capacitor.

Figure 11:
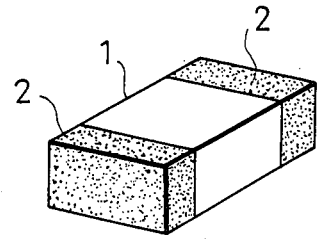
FIG. 11 is a perspective view of the external appearance of a conventional ceramic laminated capacitor.
Figure 12:
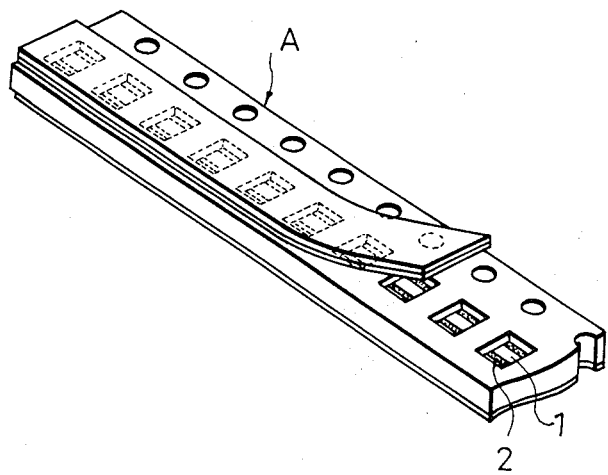
FIG. 12 is a perspective view of a taping reel for conveying the conventional laminated ceramic capacitors.

The reference numeral 11 denotes a ceramic laminated chip having a rectangular parallelepipedic external configuration, which is composed of a dielectric 12 provided with an inner electrode which is arranged in the shape of the teeth of a comb, and outer electrodes 13 connected to both ends of the inner electrode. The structure and the manufacturing method of the ceramic laminated chip 11 is the same as those of the conventional ceramic laminated chip shown in FIG. 11. A pair of semicylindrical insulators 14 having a vertical section of a segment are bonded to the opposing end surfaces of the chip 11 such that the peripheral surfaces of the semicylindrical insulators 14 face outward. The insulator 14 is composed of an insulating material which can sufficiently resist the soldering temperature for a thermosetting resin, ceramic, and the like. After fabricating the chip, the insulators are adhered to the end surfaces of the chip 11 by an adhesive of an epoxy resin or the like, so that the rectangular parallelepipedic chip 11 is formed into an approximately cylindrical ceramic laminated capacitor having an oval-shaped vertical section. To both ends of the ceramic laminated capacitor integrally provided with the insulators 14, an oval-shaped cap 15 consisting of a good conductor such as copper is secured by a conductive adhesive or the like. By covering the ends of the ceramic laminated capacitor with the caps 15 in this way, an approximately cylindrical ceramic laminated capacitor having a very high heat resistance to a soldering temperature is obtained.

Although the insulators 14 are bonded to the upper and lower surfaces of the rectangular parallelepipedic chip 11 in the direction of lamination in this embodiment, a similar configuration is obtained by adhering the insulators 14 to the front and rear ends thereof perpendicularly to the direction of lamination. In order to produce a ceramic laminated capacitor having a configuration closer to a cylinder, the insulators 14 are adhered to all the four surfaces other than the two surfaces on which the external electrode 13 are formed.

As described above, according to the present invention, it is possible to make the external configuration of a ceramic laminated capacitor close to a cylinder, which has conventionally been considered to be impossible. As a result, it is possible to reduce the conveying time and improve the conveying efficiency. Thus, the present invention is practically very effective.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A generally cylindrical, ceramic laminated capacitor adapted to be fed by automatic tube feeding means, comprising:

ceramic dielectric layers and inner electrode layers laminated on each other;

outer electrodes connected to said inner electrode layers to unite said ceramic dielectric layers, said inner electrode layters and said outer electrodes into one body; and a pair of insulators, having an arcuate outer surface of convex configuration and a flat inner surface, which are integrally bonded to opposing end surfaces of said dielectric layers such that the convex surfaces of said insulators face outward to form with said dielectric layers said generally cylindrical shape.

2. A ceramic laminated capacitor according to claim 1, wherein said insulators are formed by press bonding green sheets to the upper and lower ends, respectively, of said dielectric layer in the direction of lamination when said dielectric layers are laminated.

3. A ceramic laminated capacitor according to claim 1, wherein said insulators are integrally bonded to said dielectric layers by an adhesive.

* * * * *